Aug. 15, 1967   HAYATOSHI YAMADA   3,336,531
ELECTRIC POWER CONTROL DEVICE FOR PROVIDING AN ELECTRIC POWER
PROPORTIONAL TO AN INPUT VOLTAGE APPLIED TO
THE CONTROL ELECTRODE

Filed Oct. 28, 1964

United States Patent Office 3,336,531
Patented Aug. 15, 1967

3,336,531
ELECTRIC POWER CONTROL DEVICE FOR PROVIDING AN ELECTRIC POWER PROPORTIONAL TO AN INPUT VOLTAGE APPLIED TO THE CONTROL ELECTRODE
Hayatoshi Yamada, Ohta-ku, Tokyo, Japan, assignor to Tokyo Shibaura Electric Co., Ltd., Kawasaki-shi, Japan, a corporation of Japan
Filed Oct. 28, 1964, Ser. No. 407,174
Claims priority, application Japan, Oct. 31, 1963, 38/57,683
3 Claims. (Cl. 328—155)

ABSTRACT OF THE DISCLOSURE

A valve arrangement whereby an electric AC power output is proportional to a DC voltage by making use of means responsive to the input voltage for controlling the conduction phase angle of an SCR type grid controlled rectifier. The responsive means include a triangular wave generating circuit, a frequency multiplier circuit, and, an adder circuit to add the outputs from the triangular wave generating circuit and the frequency multiplier circuit. The DC voltage and the output from the adder circuit are compared by a comparator and used to control the valve arrangement.

---

This invention relates to an electric power control device by means of an electric valve having a control electrode and more particularly to an electric power control device which can provide an electric power proportional to an input voltage applied to the control electrode.

In a typical electric power control device of the kind above referred to one or more electric valves having control electrodes, such as grid controlled gas or vapor electric discharge devices, immersion igniter type electric discharge valves or silicon controlled rectifier elements are connected between a source of constant alternating current voltage and a load to vary the load current by varying the phase angle of the control voltage applied to the control electrode with respect to the anode voltage. Usually, between input terminals across which a variable DC control voltage $ei$ is applied and the control grid is included a pulse generator to generate control pulses of phase angle $\alpha$ which varies in proportion to the magnitude of the control voltage $ei$. In such an arrangement, the power $p_0$ in watts consumed by the local can be expressed by the following equation:

$$p_0 = e \times i = e \times \frac{e}{R} = \frac{e^2}{R} = \frac{E^2 \sin \omega t}{R}$$

where
$e = E \sin \omega t$, the instantaneous value of alternating current voltage,
$i$ = current supplied to the load,
$R$ = resistance of the load, and the mean output power $\bar{p}_0$ of the rectifier element when it is rendered conductive at a conduction phase angle $\alpha$ is represented by the following equation:

$$\bar{p} = \frac{1}{2\pi} \int_\alpha^\pi \frac{E^2 \sin^2 \omega t}{R} d\omega t = \frac{E^2}{4\pi R}(\pi - \alpha + \tfrac{1}{2} \sin 2R)$$

Thus, the mean output power $\bar{p}_0$ is a function of the conduction phase angle $\alpha$ of the rectifier element. As mentioned above while the conduction phase angle $\alpha$ is proportional to the input control voltage $ei$ the mean output power $p_0$ is not proportional to the conduction phase angle $\alpha$ as can be clearly noted from the Equation 1 so that $\bar{p}_0$ and $ei$ are not proportional.

In most of the usual control devices, however, it is desirable to maintain proportionality between the input control quantity and the output controlled quantity, but the aforementioned prior art electric power control device utilizing a grid controlled electric valve means can not satisfy this requirement.

It is therefore the principal object of this invention to provide an electric valve means which can supply electric power to a load which is proportional to a variable input control voltage.

Another object of this invention is to provide a novel control signal generator for a grid controlled electric valve means which causes it to provide an output power which is proportional to the input control quantity.

Briefly stated, the principle of this invention can be expressed as follows:

In the aforementioned Equation 1, let us assume a function $$f(t) = \pi - \omega t + \tfrac{1}{2} \sin 2\omega t \qquad 2$$

According to this invention the function $f(t)$ and the input voltage $ei$ are compared to produce a pulse in the form of a pulse or a rectangular wave at a phase where the function $f(t)$ and the input voltage $ei$ are equal and this signal is utilized to turn on the electric valve means at a phase angle $\alpha$. Then the relation between the conduction phase angle $\alpha$ of the grid controlled electric valve means and the input voltage $\alpha$ can be given by the following equation:

$$ei = f(t)_{\omega t = \alpha} = (\pi - \omega t + \tfrac{1}{2} \sin 2\omega t)_{\omega t = \alpha}$$

$$\therefore = \pi - \alpha + \tfrac{1}{2} \sin 2\alpha \qquad 3$$

By substituting the Equation 3 in the Equation 1

$$\bar{p}_0 = \frac{E^2}{4\pi R} ei \qquad 4$$

This equation shows that the mean output power $\bar{p}_0$ is proportional to the input voltage $ei$ and that the proportionality constant is equal to $E^2/4\pi R$. Thus, it will be obvious that by controlling the grid controlled rectifier element at a conduction phase angle $\alpha$ which satisfies the relation expressed by the Equation 3 it would be possible to provide mean output power $\bar{p}_0$ which is proportional to the input control voltage $ei$.

This invention can be practiced by providing a novel control device for an electric valve means having a control electrode and energized by a source of alternating current, comprising means responsive to a variable DC control voltage $ei$ to generate a control signal for said control electrode having a phase relation with respect to said control voltage expressed by an equation $$ei = \pi - \alpha + \tfrac{1}{2} \sin 2\alpha$$

where $\alpha$ represents the phase angle of said control signal with regard to a sine wave AC voltage applied to a load through said electric valve means.

The above and other features of the invention which are believed to be new are set forth with particularity in the appended claims. The invention itself, however, together with further objects and advantages thereof may best be understood by reference to the following description when taken in conjunction with the accompanying drawings in which:

Figure 1:
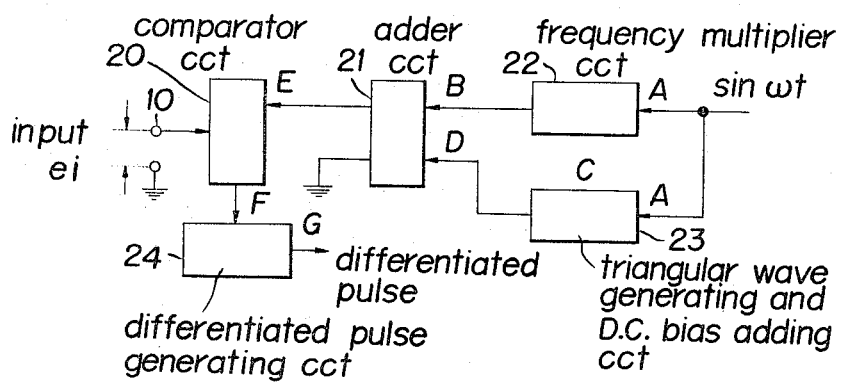
FIG. 1 is a block diagram to illustrate one example of a control signal generating device embodying the principle of this invention and adapted to control a grid controlled electric valve means.
Figure 2:
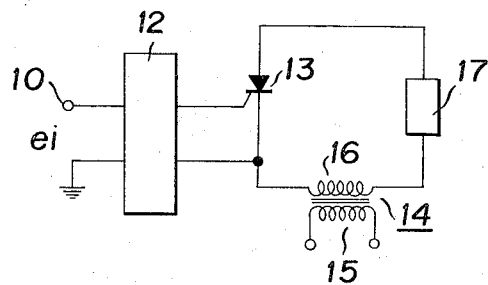
FIG. 2 is a connection diagram of this invention as applied to a silicon controlled rectifier element.
Figure 3A:
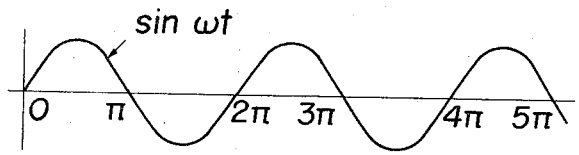
FIGS. 3(A) to 3(H) show a group of curves to explain the operation of the control device of this invention.
Figure 3B:
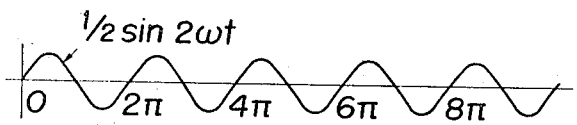
Figure 3C:
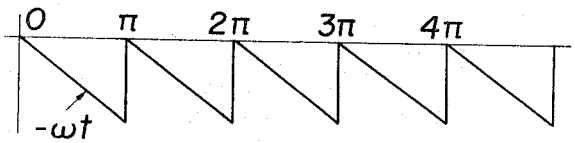
Figure 3D:
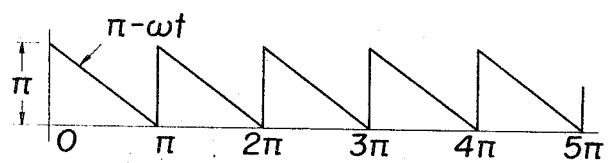
Figure 3E:
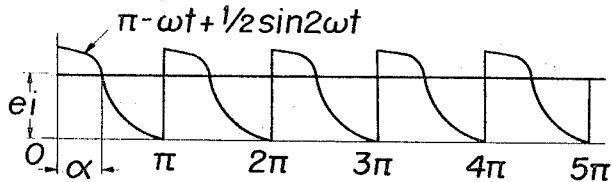
Figure 3F:
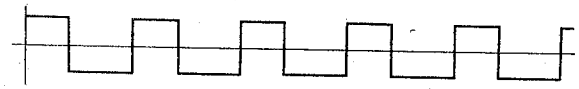
Figure 3G:
Figure 3H:
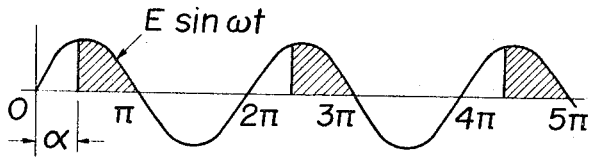

Referring now to the accompanying drawings, more particularly to FIG. 1, there is shown a block diagram of a control signal generating device for generating a control signal in the form of a pulse or a rectangular wave adapted to control a gate electrode of a silicon controlled rectifier element 13, FIG. 2, at a phase angle which is related to an input voltage $ei$ as defined by the Equation 3. As shown by FIG. 2 the silicon controlled rectifier element 13 is inserted between a secondary winding 16 of a transformer 14 and a load 17, the primary winding 15 of the transformer being energized by an alternating voltage of $e=E \sin \omega t$. Between an input terminal 10 to which is applied a control variable DC input voltage $ei$ is applied and the gate electrode is included a control signal generating device, which as shown in FIG. 1 comprises a comparator circuit 20 connected to the input terminal 10, an adder circuit 21, a frequency multiplier 22 and a triangular wave or saw tooth wave generating and DC bias adder circuit 23, the frequency multiplier and the adder circuit being energized by a sine wave AC voltage which is synchronized with the AC voltage applied to the primary winding of the transformer 14. The control signal generating device further includes a pulse generating circuit 24 containing a suitable differentiating circuit and a rectifier circuit to rectify the differentiated pulses. These component parts are connected as shown in FIG. 1.

The operation of the control signal generating device will now be considered by referring to FIG. 3 wherein curves A to G inclusive show various wave forms at various points in FIG. 1 designated by corresponding reference letters. As mentioned above, a sine wave AC voltage $E \sin \omega t$ shown by a curve A which is synchronous with the secondary voltage shown by a curve H is applied to the input terminals of the frequency multiplying circuit 22 and the triangular wave generating circuit 23 including the DC bias adding circuit to obtain a sine wave AC voltage of doubled frequency and one half amplitude $½ \times \sin 2\omega t$, curve B, which is applied to one input terminal of the adder circuit 21. On the other hand the circuit 23 generates a triangular or saw tooth voltage $-\omega t$ as shown by a curve C and adds thereto a DC bias voltage $\alpha$ to provide an output voltage $\alpha - \omega t$, curve D, to the other terminal of the adder circuit 21. Thus the adder circuit operates to add the outputs from the frequency multiplier 22 and the triangular wave generating circuit 23 to apply an output $\pi - \omega t + ½ \sin 2\omega t$ (curve E) to the other terminal of the comparator circuit 20. As has been pointed out before, the comparator circuit 20 operates to compare the control DC voltage $ei$ and said output from the adder circuit to generate a rectangular wave as shown by a curve F when these two inputs are equal. The rectangular wave is then applied to the pulse generating circuit 24 containing a differentiating circuit and a rectifier to rectify the differentiated pulse to obtain a pulse, as shown by curve G which is applied to the gate electrode of the silicon controlled rectifier element 13 at a conduction phase angle $\alpha$ having a relation with respect to the control input voltage $ei$ as represented by the Equation 3. As a result the silicon controlled rectifier element 13 will become conductive at a phase angle $\alpha$ to pass current to the load 17 during the shaded portion of each of the positive half cycles of the AC voltage supplied to the primary winding of the transformer 14, as shown by a curve H, FIG. 3. Thus, it will be clear that the power consumed by the load is always proportional to the magnitude of the control DC voltage $ei$.

Thus, this invention provides simple but effective control device or circuit which can so control a controlled rectifier means as to provide a variable output power to a load which is always proportional to the magnitude of a variable DC control input voltage.

While the invention has been described in connection of a simplest form of an electric valve power converting means, it will be obvious to those skilled in the art that the electric valve means may be a single phase, poly phase, half wave or full wave rectifier or a variable AC impedance, that is it may comprise one or more pairs of parallel controlled rectifier elements connected in opposite polarities. It is also to be noted that in addition to the disclosed silicon controlled rectifier element any type of controlled rectifier element may be used such as grid controlled mercury arc rectifier, gas or vapor electric discharge device, immersion electrode type vapor electric discharge device and the like. The invention, therefore, is not to be limited to the disclosed embodiment but is to be regarded as embracing all modifications falling within the scope of the appended claims.

What I claim as new and desire to secure by Letters Patent of the United States is:

1. In combination, a source of sine wave AC voltage, a load, an electric valve means having a control electrode and connected between said source and said load, means to supply a variable DC control voltage $ei$ and means responsive to said control voltage to generate a control signal for said control electrode having a phase relation with respect to said control voltage expressed by an equation $$ei = \pi - \alpha + ½ \sin 2\alpha$$

where $\alpha$ represents the phase angle of said control signal with regard to said sine wave AC voltage.

2. In combination, a source of sine wave AC voltage, a load, an electric valve means connected between said AC source and said load, said electric valve means being provided with a control electrode, a source of variable DC control voltage and means responsive to said DC voltage to generate a control signal for said control electrode, said means comprising a triangular wave generating circuit, a frequency multiplier, said triangular wave generating circuit and said frequency multiplier being energized by a sine wave AC voltage which is synchronous with said first mentioned AC voltage, an adder circuit to add the outputs from said triangular wave generating circuit and said frequency multiplier, a comparator circuit to compare said variable DC voltage and the output from said adder circuit whereby to control said electric valve converting device so as to vary the electric power consumed by said load in proportion to the magnitude of said variable DC control voltage.

3. In combination, a source of sine wave AC voltage, $E \sin \omega t$, a load, an electric valve means connected between said AC source and said load, said electric valve being provided with a control electrode, a source of variable DC control voltage $ei$ and means responsive to said DC voltage to generate a control signal for said control electrode, said means comprising a frequency doubler to generate a double frequency alternating current of $½ \times \sin 2\omega t$, means to generate a triangular wave $-\omega t$, said frequency doubler and said triangular wave generator being energized by a sine wave AC voltage synchronous with said first mentioned AC voltage, means to combine a bias $\alpha$ with said triangular wave $-\omega t$ to obtain a single $\pi - \omega t$, an adder to add said double frequency alternating current and said signal $\pi - \omega t$ to obtain an output signal $\pi - \omega t + ½ \sin 2t$, a comparator to compare said variable DC control voltage $ei$ with said output signal from said adder to provide a rectangular output signal at a phase $\alpha$ when they are equal, means to differentiate said rectangular output signal to generate said control signal for said control electrode having a conduction phase angle $\alpha$ which is related to said control voltage according to an equation $$ei = \pi - \alpha + ½ \sin 2\alpha$$

No references cited.

ARTHUR GAUSS, *Primary Examiner.*

DAVID J. GALVIN, *Examiner.*

J. BUSCH, *Assistant Examiner.*